(12) United States Patent
Jo

(10) Patent No.: US 10,712,597 B2
(45) Date of Patent: Jul. 14, 2020

(54) DISPLAY DEVICE

(71) Applicant: LG Display Co., Ltd., Seoul (KR)

(72) Inventor: Tae-Soo Jo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/050,090

(22) Filed: Jul. 31, 2018

(65) Prior Publication Data

US 2019/0041683 A1    Feb. 7, 2019

(30) Foreign Application Priority Data

Aug. 1, 2017    (KR) .................. 10-2017-0097676

(51) Int. Cl.
| | | |
|---|---|---|
| *G02F 1/1333* | (2006.01) | |
| *C09J 11/04* | (2006.01) | |
| *C09J 133/06* | (2006.01) | |
| *G02F 1/13357* | (2006.01) | |
| *C09J 11/08* | (2006.01) | |
| *C09J 175/04* | (2006.01) | |
| *C09J 4/00* | (2006.01) | |
| *C08G 18/76* | (2006.01) | |
| *G02F 1/1368* | (2006.01) | |

(52) U.S. Cl.
CPC ... *G02F 1/133308* (2013.01); *C08G 18/7671* (2013.01); *C09J 4/00* (2013.01); *C09J 11/04* (2013.01); *C09J 11/08* (2013.01); *C09J 133/06* (2013.01); *C09J 175/04* (2013.01); *G02F 1/133603* (2013.01); *G02F 1/133606* (2013.01); *G02F 1/133608* (2013.01); *C09J 2205/31* (2013.01); *G02F 1/1368* (2013.01); *G02F 2001/133314* (2013.01); *G02F 2202/28* (2013.01); *G02F 2203/03* (2013.01)

(58) Field of Classification Search
CPC .............. G02F 2202/28; G02F 2203/03; G02F 1/133308; G02F 1/136209; G02F 1/133504; B32B 37/1284; B32B 38/18; H01L 51/5246; H01L 51/5284; G02B 6/0043

See application file for complete search history.

(56) References Cited

U.S. PATENT DOCUMENTS

| | | | | |
|---|---|---|---|---|
| 2012/0163027 | A1* | 6/2012 | Vissenberg | G02B 6/005 362/612 |
| 2015/0092122 | A1* | 4/2015 | Youn | G06F 1/1643 349/12 |
| 2016/0342011 | A1* | 11/2016 | Zhang | G02B 6/005 |
| 2016/0349442 | A1* | 12/2016 | Berard | B32B 17/10018 |
| 2017/0025485 | A1* | 1/2017 | Kim | H01L 51/5237 |
| 2017/0329183 | A1* | 11/2017 | Tsuchida | G02F 1/133606 |
| 2018/0031918 | A1* | 2/2018 | Sugiyama | G02B 6/0053 |
| 2018/0074359 | A1* | 3/2018 | Wang | G02B 6/0088 |

* cited by examiner

*Primary Examiner* — Michael H Caley
*Assistant Examiner* — Jonathan Y Jung
(74) *Attorney, Agent, or Firm* — Morgan, Lewis & Bockius LLP

(57) ABSTRACT

A display device is disclosed. The display device includes a display panel configured to display an image, an optical member under the display panel, and a support member under the optical member. The display device further includes a first adhesive member between the display panel and the optical member, and a second adhesive member between the optical member and the support member. The first adhesive member has higher transmittance than the second adhesive member.

19 Claims, 10 Drawing Sheets

DISPLAY DEVICE

CROSS-REFERENCE TO RELATED APPLICATION

The present application claims priority from and the benefit of Korean Patent Application No. 10-2017-0097676 filed on Aug. 1, 2017, which is hereby incorporated by reference in its entirety for all purposes as if fully set forth herein.

BACKGROUND OF THE INVENTION

1. Technical Field

The present disclosure relates to a display device, and more particularly, to a display device having no bezel area or a minimized bezel area using an adhesive member.

2. Discussion of the Related Art

With rapid development of information technologies, display devices for displaying a large amount of information are being developed. Recently, flat panel display (FPD) devices having a thin profile, light weight, and low power consumption, such as liquid crystal display devices or electroluminescent display devices, have been suggested and widely applied.

The flat panel display devices are widely used for portable devices, such as smartphones, computer monitors, or televisions. A display panel is typically provided for a flat panel display device after being modularized and commercialized with mechanical parts such as various cases or covers. The display panel of the flat panel display device includes a display area for displaying an image and a non-display area surrounding the display area. The case or cover at a front surface of the display panel may cover the non-display area. Here, a portion of the case or cover covering the non-display area becomes a bezel area of a product incorporating the display panel.

A larger bezel area in which an image is not displayed may increase the size of the product and make the appearance of the product less attractive.

Therefore, recently, borderless products have been researched and developed with a neat appearance in which the mechanical parts, such as the cases, are omitted or minimized to reduce the thickness and weight of a display device, decrease the bezel area, and maximize the size of a display area in the display device having the same size.

To do this, a structure has been suggested in which an adhesive member is applied between the display panel and the mechanical part supporting the display panel. The adhesive member fixes the display panel to the mechanical part.

However, since the related art adhesive member is opaque and does not transmit light, the display device has a dark portion around its edges. Thus, the display device still has a bezel area of a relatively large width due to the dark portion.

On the other hand, if the width of the adhesive member is reduced in order to minimize the bezel area, the adhesion between the components of the display device is weakened.

SUMMARY

Accordingly, embodiments of the present disclosure are directed to a display device that substantially obviates one or more of the problems due to limitations and disadvantages of the related art.

An object of the present disclosure is to provide a display device that mitigates the dark portion problem around edges of the display device including an adhesive member, and removes or minimizes the bezel area.

Additional features and advantages of the present disclosure will be set forth in the description which follows, and in part will be apparent from the description, or may be learned by practice of the present disclosure. The objectives and other advantages of the present disclosure will be realized and attained by the structure particularly pointed out in the written description, or derivable therefrom, and claims hereof as well as the appended drawings.

To achieve these and other aspects of the inventive concepts, as embodied and broadly described, a display device comprises: a display panel configured to display an image; an optical member under the display panel; a support member under the optical member; a first adhesive member between the display panel and the optical member; and a second adhesive member between the optical member and the support member, wherein the first adhesive member has higher transmittance than the second adhesive member.

In another aspect, a display device comprises: a display panel configured to display an image; an optical member under the display panel; and a first adhesive member between the display panel and the optical member, and connecting the display panel and the optical member at an outer periphery of the display panel, the first adhesive member being substantially transparent.

It is to be understood that both the foregoing general description and the following detailed description are by example and explanatory, and are intended to provide further explanation of the present disclosure as claimed.

BRIEF DESCRIPTION OF THE DRAWINGS

The accompanying drawings, which are included to provide a further understanding of the present disclosure and which are incorporated in and constitute a part of this specification, illustrate embodiments of the present disclosure and together with the description serve to explain various principles of the present disclosure. In the drawings.

DETAILED DESCRIPTION

Reference will now be made in detail to embodiments of the present disclosure, examples of which may be illustrated in the accompanying drawings.

Figure 1:
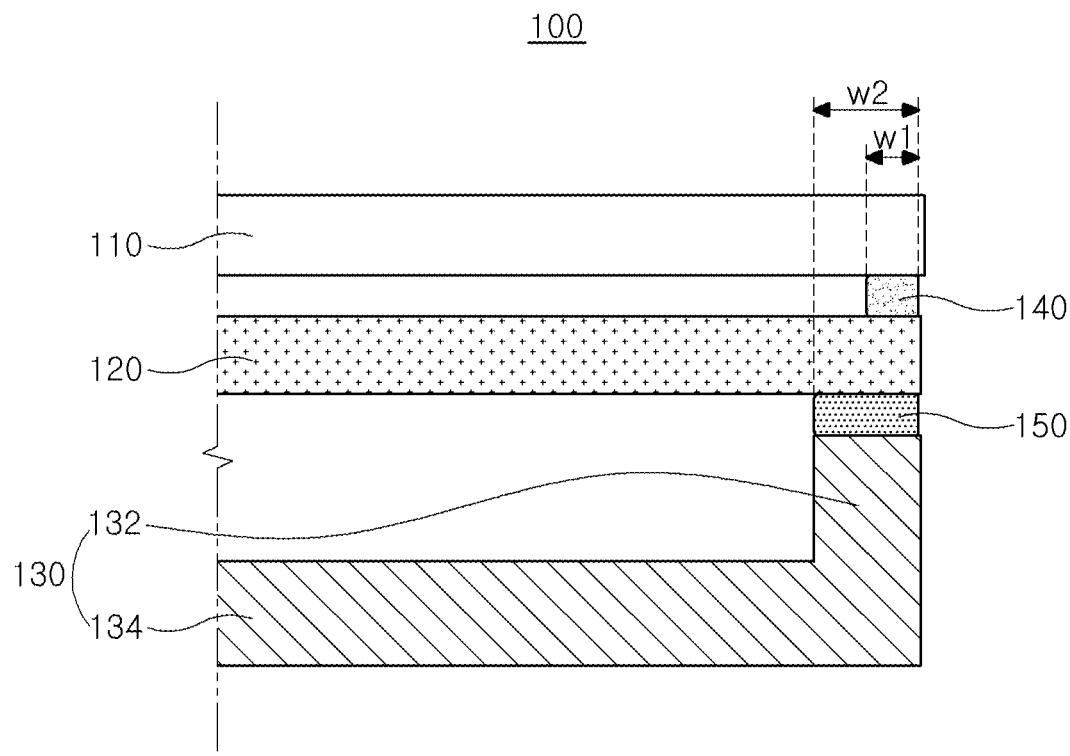
FIG. 1 is a cross-sectional view schematically showing a display device according to an embodiment of the present disclosure.
Figure 2:
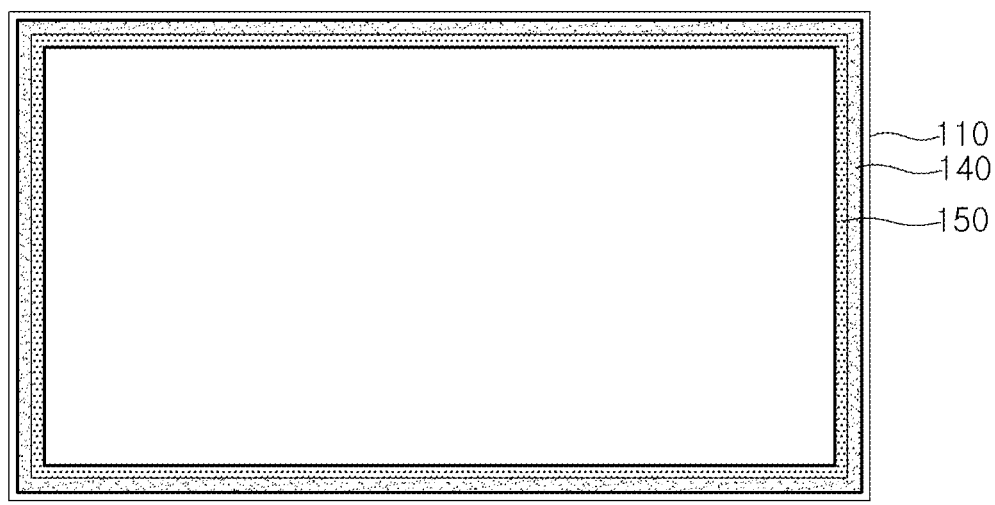
FIG. 2 is a plan view schematically showing the display device according to an embodiment of the present disclosure.

FIG. 1 is a cross-sectional view schematically showing a display device according to an embodiment of the present disclosure. FIG. 2 is a plan view schematically showing the display device according to an embodiment of the present disclosure.

As shown in FIG. 1 and FIG. 2, the display device 100 according to an embodiment of the present disclosure may include a display panel 110, an optical member 120, and a support member 130.

The display panel 110 may include a plurality of pixels and display an image through a front surface thereof. The display panel 110 may be a liquid crystal display panel including a liquid crystal capacitor or an electroluminescent display panel including a light-emitting diode, but the present disclosure is not limited thereto.

The optical member 120 may be disposed under the display panel 110, that is, at a rear surface opposite the front surface through which the image is displayed. The optical member 120 may enhance characteristics of light outputted from the display panel 110. The optical member 120 may be integrally formed. Here, the optical member 120 may have a function of diffusing light and/or increasing light efficiency.

If the display panel 110 is a liquid crystal display panel, the optical member 120 may have a light diffusion function. Here, the display device 100 may further include a light source (not shown) between the optical member 120 and the support member 130. Light from the light source may be diffused by the optical member 120 and be more uniformly provided to the display panel 110. In addition, the optical member 120 may further have a function of increasing light efficiency. The optical member 120 may increase the amount of light provided to the display panel 110 from the light source by repeating selective reflection of light. The optical member 120 and the light source may constitute a backlight unit.

Alternatively, if the display panel 110 is an electroluminescent display device, the optical member 120 may have a function of increasing light efficiency. Here, the optical member 120 may return light, which is emitted from the display panel 110 and directed to the rear surface of the display panel 110, toward the front surface of the display panel 110.

The support member 130 may be disposed under the optical member 120 and support the optical member 120 and the display panel 110. The support member 130 may have a first portion 132 corresponding to edges of the optical member 120. Moreover, the support member 130 may further include a second portion 134 connected to the first portion 132 and corresponding to a rear surface of the optical member 120.

The support member 130 may be formed of a plastic material, such as polycarbonate (PC), or a metallic material, such as aluminum (Al), stainless steel (SUS), or electrolytic galvanized iron (EGI), but the present disclosure is not limited thereto.

If the display panel 110 is a liquid crystal display panel, the support member 130 may be a main frame or a bottom cover. Alternatively, if the display panel 110 is an electroluminescent display panel, the support member 130 may be a back cover.

In addition, the display device 100 may further includes a first adhesive member 140 between the display panel 110 and the optical member 120, and a second adhesive member 150 between the optical member 120 and the support member 130.

The first adhesive member 140 may be disposed between edges of the display panel 110 and the edges of the optical member 120, and fix the display panel 110 and the optical member 120 to each other. Furthermore, the second adhesive member 150 may be disposed between the edges of the optical member 120 and the first portion 132 of the support member 130, and fix the optical member 120 and the support member 130 to each other. The first adhesive member 140 and the second adhesive member 150 may overlap each other.

Here, although a side surface of the display panel 110 is shown protruding outwardly from a side surface of the optical member 120, the present disclosure is not limited thereto. The side surface of the display panel 110 and the side surface of the optical member 120 may be placed on the same plane. Here, an outer side surface of the first adhesive member 140 may coincide with the side surfaces of the display panel 110 and the optical member 120. Additionally, it is shown, for example, in FIG. 1, that the side surface of the optical member 120 and a side surface of the support member 130 are disposed on the same plane. Alternatively, the side surface of the optical member 120 may protrude outwardly from the side surface of the support member 130.

The first adhesive member 140 has a first width w1, and the second adhesive member 140 has a second width w2. The second width w2 may be larger than the first width w1. The second width w2 may be twice the first width w1 or larger. For example, the first width w1 may be about 0.4 mm, and the second width w2 may be about 1.0 mm. Therefore, adhesion between the support member 130 and the optical member 120 may further increase.

The first adhesive member 140 may have higher transmittance than the second adhesive member 150. Here, the second adhesive member 150 may have a light scattering function. The first adhesive member 140 and the second adhesive member 150 may be formed of the same material, and the second adhesive member 150 may further include scattering bodies. Alternatively, the first adhesive member 140 and the second adhesive member 150 may be formed of different materials.

More particularly, the first adhesive member 140 and the second adhesive member 150 may be an elastic resin formed of an adhesive composition comprising an acrylate oligomer, a urethane oligomer, and a photoinitiator.

The acrylate oligomer is an ultraviolet curable component having an ethylene double bond and may be contained in a proportion of 30 to 70 wt %, preferably 40 to 60 wt % of the adhesive composition. If the content of the acrylate oligomer is less than 30 wt %, the viscosity decreases, and it may be difficult to control the physical properties of the adhesive member. On the other hand, if the content of the acrylate oligomer exceeds 70 wt %, the viscosity increases excessively, and this may cause problems in controlling the curing reaction rate and viscosity.

Examples of the acrylate oligomer include methyl methacrylate, ethyl methacrylate, n-propyl methacrylate, iso-propyl methacrylate, n-butyl methacrylate, iso-butyl methacrylate, tert-butyl methacrylate, 2-ethylhexyl methacrylate, octyl methacrylate, decyl methacrylate, dodecyl methacrylate, lauryl methacrylate, and the like, but are not limited thereto.

The urethane oligomer exhibits adhesive properties, and the content of the urethane oligomer may be 30 to 60 parts by weight, preferably 45 to 55 parts by weight, to 100 parts by weight of the acrylate oligomer. If the content of the urethane oligomer is less than 30 parts by weight, the adhesion may be lowered. On the other hand, if the content of the urethane oligomer is larger than 60 parts by weight, the transparency of the adhesive member may decrease.

The urethane oligomer may include a hard segment urethane prepolymer comprising an isocyanate group and a soft segment urethane prepolymer comprising ether type polyol. For example, diphenylmethane diisocyanate (or methylene diphenyl diisocyanate (MDI)) may be used as the hard segment urethane prepolymer, and a compound represented by the following formula 1 may be used as the soft segment urethane prepolymer, but embodiments are not limited thereto.

Formula 1

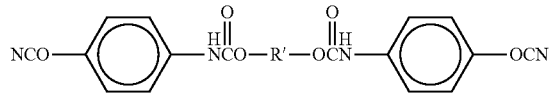

The photoinitiator may be included in an amount of 1 to 5 parts by weight, preferably 1 to 3 parts by weight to 100 parts by weight of the acrylate oligomer. If the content of the photoinitiator is less than 1 part by weight, the curing reaction rate may become excessively slow or the initiating function may not be performed, and the curing efficiency may decrease. On the other hand, if the content of the photoinitiator exceeds 5 parts by weight, yellowing phenomenon may be caused due to the ring structure characteristic of the photoinitiator not participating in curing.

Examples of the photoinitiator include acetophenone-based photoinitiators, such as 2,2'-diethoxyacetophenone, 2,2'-dibutoxyacetophenone, 2-hydroxy-2-methylpropiophenone, p-t-butyltrichloroacetophenone, p-t-butyldichloroacetophenone, 4-chloroacetophenone, 2,2'-dichloro-4-phenoxyacetophenone, and the like; benzophenone-based photoinitiators, such as benzophenone, 4-4'-dimethylaminobenzophenone, 4-4'-dichloro benzophenone, 3,3'-dimethyl-2-methoxybenzophenone, 4-pheny benzophenone, hydroxy benzophenone, acrylate benzophenone, 4,4'-bis(dimethylamino)benzophenone, 4,4'-bis(diethyl) benzophenone, and the like; thioxanthone-based photoinitiators, such as thioxanthone, 2-methylthioxanthone, isopropylthioxanthone, 1-[9-ethyl-6-(2-methylbenzoyl)-9H-carbazole-3-3-yl]-1-(0-acetyloxyme), 2,4-dithyl thioxanthone, 2,4-diisopropyl thioxanthone, 2-chlorothioxanthone, and the like; benzoin-based photoinitiators, such as benzoin, benzoin methyl ether, benzoin ethyl ether, benzoin isopropyl ether, benzoin isobutyl ether, benzyl dimethyl ketal, and the like; and triazine-based photoinitiators, such as 4,6-trichloro-s-triazine, 2-phenyl-4,6-bis(trichloromethyl)-s-triazine, 2-4-trichloromethyl(piperonyl)-6-triazine, 2-(4'-methoxynaphthyl)4-6-bis(trichloromethyl)-s-triazine, 2-(p-methoxyphenyl)-4,6-bis(trichloromethyl)-s-triazine, and the like, but are not limited thereto.

The adhesive composition of the second adhesive member 150 may further include scattering bodies. The scattering bodies give a scattering function to the second adhesive member 150 and may also improve a shape of the second adhesive member 150.

The scattering bodies may have a size in nanometers, and the scattering function of the second adhesive member 150 can be adjusted by controlling the size, shape, and concentration of the scattering bodies.

The scattering bodies may be contained in an amount of 3 to 10 parts by weight, preferably 3 to 5 parts by weight, to 100 parts by weight of the acrylate oligomer. If the content of the scattering bodies is less than 3 parts by weight, the scattering efficiency may decrease, and the luminance may not improve. If the content of the scattering bodies exceeds 10 parts by weight, the adhesion may be lowered.

ZnO, TiO$_2$, polystyrene beads, and the like may be used as the scattering bodies, but embodiments are not limited thereto.

In addition, the adhesive composition of the adhesive member 140 and/or 150 may further comprise other additives. Examples of other additives include, without limitation, a catalyst, a shape controlling agent, a coupling agent, a dehydrating agent, a tackifier, a wax component, an antioxidant, a light stabilizer, and the like. The adhesive composition may comprise one or more from these additives.

The catalyst may be used for increasing the reaction rate. Examples of the catalyst include diethanol amine for promoting urethane polymerization and/or tin-based materials for accelerating moisture curing to shorten the curing time, such as dibutyl tin dilaurate, but are not limited thereto. The catalyst may be contained in an amount of 1 to 5 parts by weight, preferably 1 to 2 parts by weight, to 100 parts by weight of the acrylate oligomer.

The shape controlling agent may be used for maintaining the shape of the adhesive member 140 and/or 150. Fumed silica may be used as the shape controlling agent, but embodiments are not limited thereto. The shape controlling agent may be contained in an amount of 1 to 5 parts by weight, preferably 1 to 2 parts by weight, to 100 parts by weight of the acrylate oligomer.

The coupling agent may be used for enhancing the adhesion to a member and may include a material containing a silane-based component, but is not limited to. The coupling agent may be contained in an amount of 1 to 5 parts by weight, preferably 1 to 3 parts by weight, to 100 parts by weight of the acrylate oligomer.

The dehydrating agent may be used for securing the storage stability in a container. The dehydrating agent may be contained in an amount of 1 to 5 parts by weight, preferably 1 to 3 parts by weight to 100 parts by weight of the acrylate oligomer.

The tackifier may be used for increasing the tackiness of the surface of the adhesive member. For example, rosin, rosin derivatives, petroleum resin, and the like can be used, but embodiments are not limited thereto. The tackifier may be contained in an amount of 1 to 5 parts by weight, preferably 1 to 3 parts by weight, to 100 parts by weight of the acrylate oligomer.

The wax component may be used for lowering the melt viscosity. For example, paraffin wax, low molecular weight wax, and the like can be used, but embodiments are not limited thereto. The wax component may be contained in an amount of 1 to 5 parts by weight, preferably 1 to 3 parts by weight, to 100 parts by weight of the acrylate oligomer.

The antioxidant may be used for reducing the thermal decomposition of the polymer during the process. For example, phosphate, benzofuranone, thiolester, and the like may be used, but embodiments are not limited thereto. The antioxidant may be contained in an amount of 1 to 5 parts by weight, preferably 1 to 3 parts by weight, to 100 parts by weight of the acrylate oligomer.

The light stabilizer may be used for the stability of the photoinitiator. For example, ultraviolet absorbers and the like may be used, but embodiments are not limited thereto. The light stabilizer may be contained in an amount of 1 to 5 parts by weight, preferably 1 to 3 parts by weight, to 100 parts by weight of the acrylate oligomer.

Hereinafter, characteristics of the first and second adhesive members of the present disclosure will be described with reference to the drawings.

Figure 3:
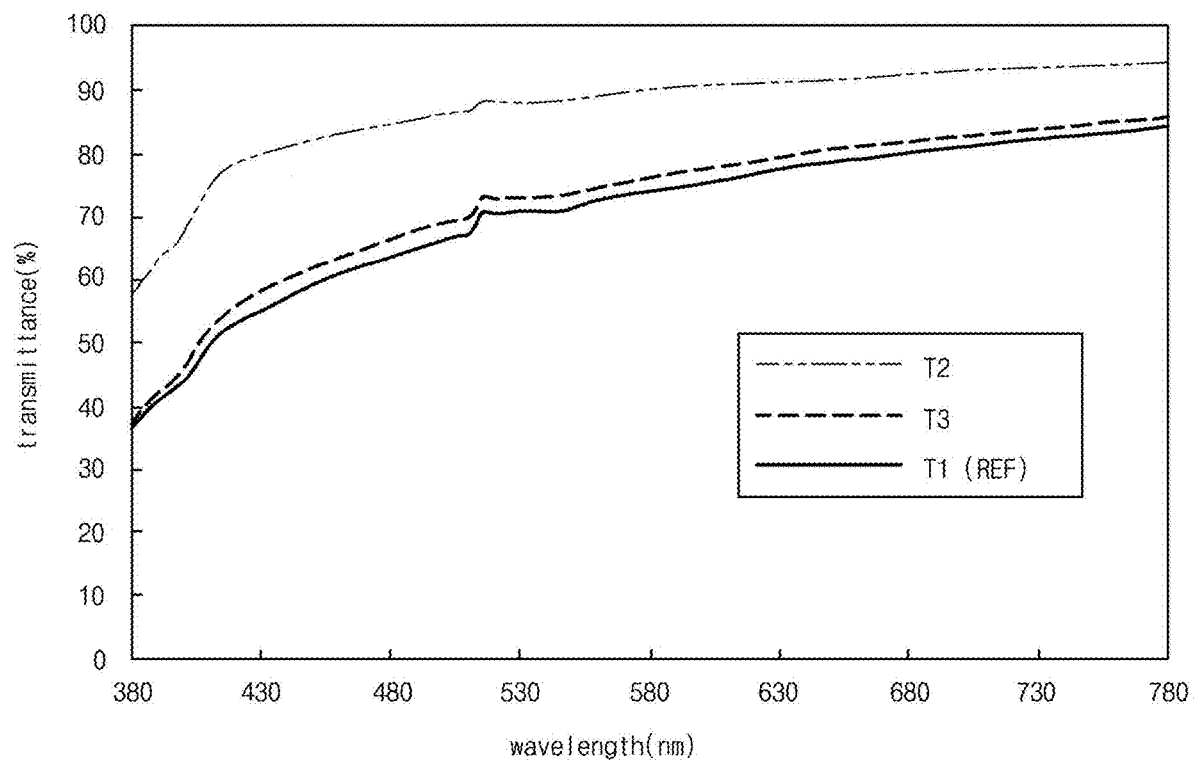
FIG. 3 is a graph showing the transmittance of first and second adhesive members according to an embodiment of the present disclosure.

FIG. 3 is a graph showing the respective transmittance of first and second adhesive members (e.g., 140 and 150 in FIGS. 1 and 2) according to an embodiment of the present disclosure, as well as the transmittance of a related art adhesive member.

Here, each of the first adhesive member and the second adhesive member of the present disclosure may be formed by applying and curing a solution containing an adhesive composition. Here, the application method may vary depending on the viscosity of the solution, and the viscosity of the solution may be 5,000 to 200,000 cps. In addition, the curing method may be a UV curing method and/or a moisture curing method, but is not limited thereto.

The adhesive composition of each of the first and second adhesive members may comprise 100 parts by weight of an acrylate oligomer, 50 parts by weight of a urethane oligomer, 1 to 3 parts by weight of a photoinitiator, 1 to 2 parts by weight of a first catalyst, 1 to 2 parts by weight of a second catalyst, 1 to 5 parts by weight of a shape controlling agent, 1 to 3 parts by weight of a coupling agent, and 1 to 3 parts by weight of a dehydrating agent. In addition, the adhesive composition of the second adhesive member may further comprise 3 to 5 parts by weight of scattering bodies.

The acrylate oligomer may include N-acryloyl morpholine (ACMO) for increasing the curing rate and modulus, isobornyl acrylate (IBOA) for increasing the adhesion and reinforcing the heat resistance, and 2-phenoxyethyl acrylate and tetraethylene glycol diacrylate for enhancing the flexibility.

As a hard segment urethane prepolymer of the urethane oligomer, diphenylmethane diisocyanate may be used to enhance the heat resistance. As a soft segment urethane prepolymer, the compound of the above formula 1 may be used to enhance the adhesion reliability.

As a photoinitiator, phenylbis (2,4,6-trimethylbenzoyl-phosphine oxide), which is a long wavelength initiator of about 405 nm, may be used to increase deep curability and inhibit surface hardening.

Diethanol amine may be used as a first catalyst, and a tin-based material, such as dibutyl tin dilaurate and the like, may be used as a second catalyst.

Dry silica may be used as a shape controlling agent. Also, materials known in the art as a coupling agent and a dehydrating agent may be used.

As shown in FIG. 3, the transmittance T1 of the related art adhesive member REF is about 40% to about 80% in the visible light range, and the related art adhesive member REF is substantially opaque.

On the other hand, the transmittance T2 of the first adhesive member of the present disclosure is mostly about 80% or more, which is an increase of up to about 30% in comparison with the transmittance T1 of the related art adhesive member REF. The first adhesive member is substantially transparent.

The transmittance T3 of the second adhesive member of the present disclosure is about 40% to about 80% in the visible light range, and the second adhesive member is substantially opaque. However, the transmittance T3 of the second adhesive member is higher than the transmittance T1 of the related art adhesive member REF.

As described above, the first and second adhesive members of the present disclosure have higher transmittance than the related art adhesive member REF. The first adhesive member is substantially transparent, and the second adhesive member is substantially opaque and has a scattering function.

FIGS. 4A to 4E are views respectively showing the luminance measured in front of a display device according to an embodiment of the present disclosure and of display devices according to first to fourth comparative examples. FIGS. 5A to 5E are views respectively showing the degree of visibility of the first adhesive members of the display device according to an embodiment of the present disclosure and of the display devices according to the first to fourth comparative examples.

Here, as mentioned above, the first adhesive member of the display device according to an embodiment of the present invention is substantially transparent, and the second adhesive member is substantially opaque and has the scattering function.

On the other hand, each of the first and second adhesive members of the display device according to the first comparative example is substantially opaque and has no scattering function. Here, the first and second adhesive members of the first comparative example may be formed of the same material as the related art adhesive member REF of FIG. 3.

Each of the first and second adhesive members of the display device according to the second comparative example is substantially opaque and has a scattering function. The first and second adhesive members of the second comparative example may be formed of the same material as the second adhesive member according to an embodiment of the present disclosure.

The display device according to the third comparative example employs a first adhesive member that is substantially opaque and has a scattering function, and a second adhesive member that is substantially transparent. That is, the display device of the third comparative example has an adhesive member configuration opposite to that of the display device according to an embodiment of the present disclosure. The first adhesive member of the display device according to the third comparative example may be formed of the same material as the second adhesive member according to an embodiment of the present disclosure. The second adhesive member of the third comparative example may be formed of the same material as the first adhesive member according to an embodiment of the present disclosure.

Each of the first and second adhesive members of the display device according to the fourth comparative example is substantially transparent. Here, the first and second adhesive members of the fourth comparative example may each be formed of the same material as the first adhesive member according to an embodiment of the present disclosure.

Figure 4A:
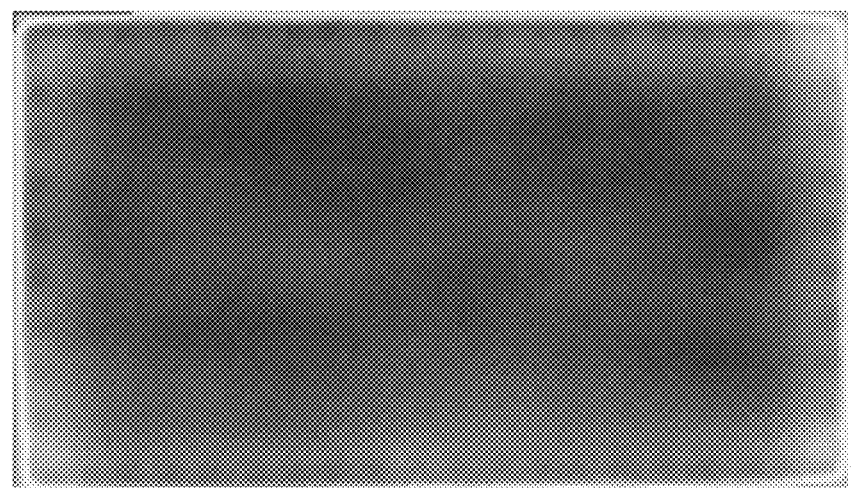
FIGS. 4A to 4E are views respectively showing the luminance measured in front of a display device according to an embodiment of the present disclosure and of display devices according to first to fourth comparative examples.
Figure 5A:
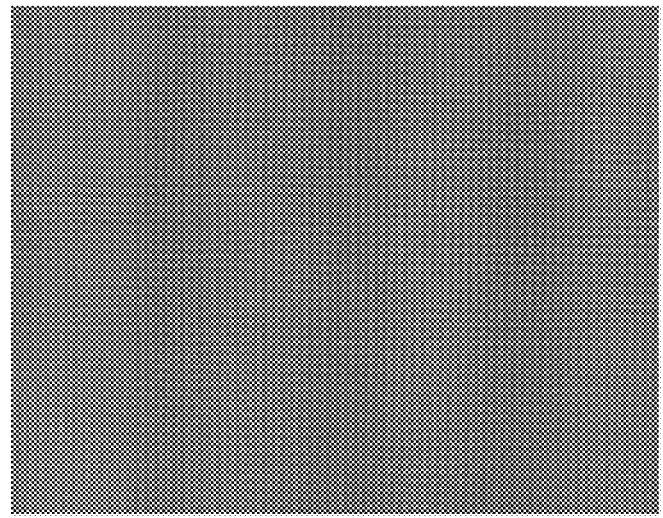
FIGS. 5A to 5E are views respectively showing the degree of visibility of the first adhesive members of the display device according to an embodiment of the present disclosure and of the display devices according to the first to fourth comparative examples.

As shown in FIG. 4A, in the display device according to an embodiment of the present disclosure, the luminance at the center portion is 758 nit, the luminance at the peripheral portion is 648 nit, and the luminance at the peripheral portion is about 85.2% of the luminance at the center portion. Therefore, the display device according to the embodiment of the present disclosure has a relatively small luminance difference between the center portion and the peripheral portion. In addition, as shown in FIG. 5A, the first adhesive member is not visible in the display device according to an embodiment of the present disclosure.

Figure 4B:
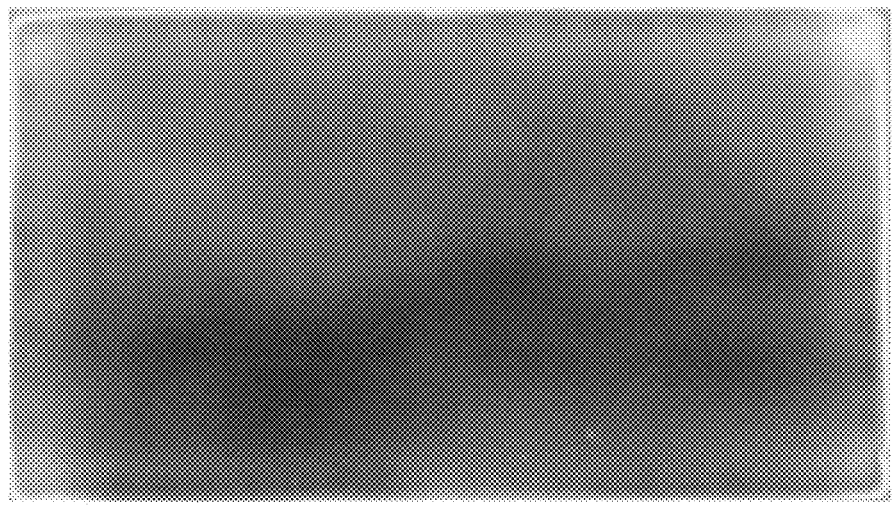
Figure 5B:
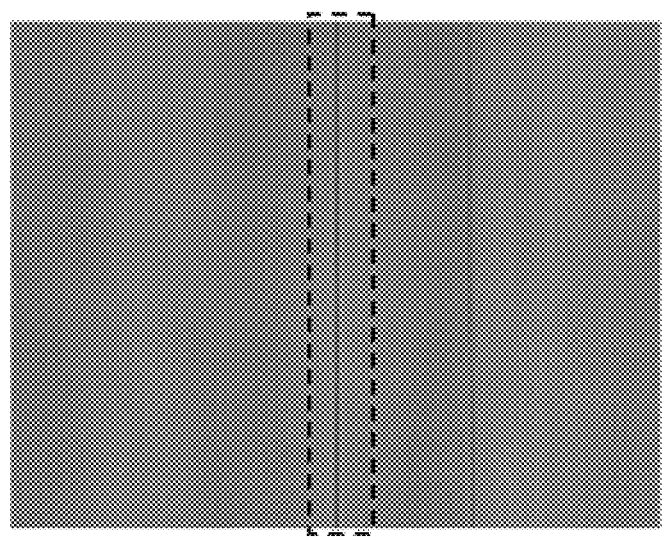

On the other hand, as shown in FIG. 4B, in the display device according to the first comparative example, the luminance at the center portion is 765 nit, the luminance at the peripheral portion is 597 nit, and the luminance at the peripheral portion is about 78.0% of the luminance at the central portion. The display device of the first comparative example has a relatively large luminance difference between the central portion and the peripheral portion. Further, as shown in FIG. 5B, the first adhesive member is clearly visible in the display device of the first comparative example.

As described above, the display device according to an embodiment of the present disclosure has higher luminance at the peripheral portion and the smaller luminance difference between the central portion and the peripheral portion than the display device according to the first comparative example using the first and second adhesive members formed of the same material as the related art adhesive member. Therefore, in the display device according to an embodiment of the present disclosure, the dark portion around the edges can be mitigated, and the first adhesive member is not visible.

Figure 4C:
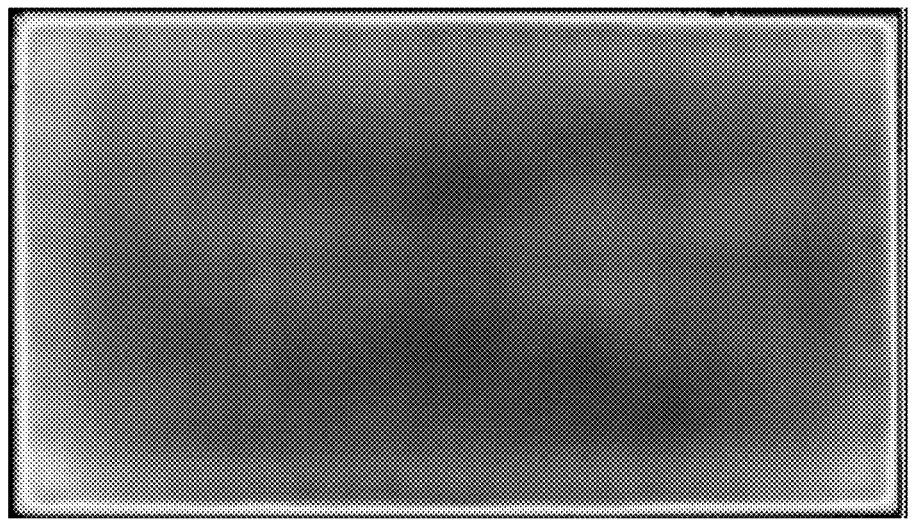
Figure 5C:
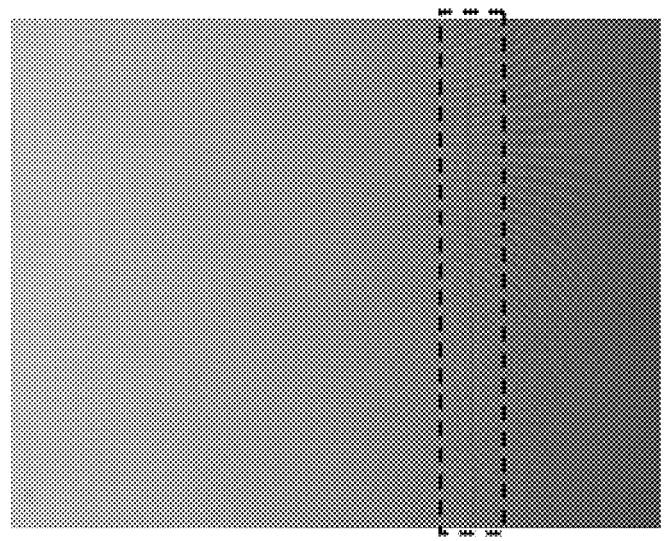

On the other hand, as shown in FIG. 4C, in the display device according to the second comparative example, the luminance at the center portion is 760 nit, and the luminance at the peripheral portion is 652 nit. Thus, the luminance at the peripheral portion is about 86.0% of the luminance at the center portion. As compared with the display device according to an embodiment of the present disclosure, the display device of the second comparative example has a smaller luminance difference between the center portion and the peripheral portion. However, as shown in FIG. 5C, the first adhesive member of the display device of the second comparative example is visible.

Figure 4D:
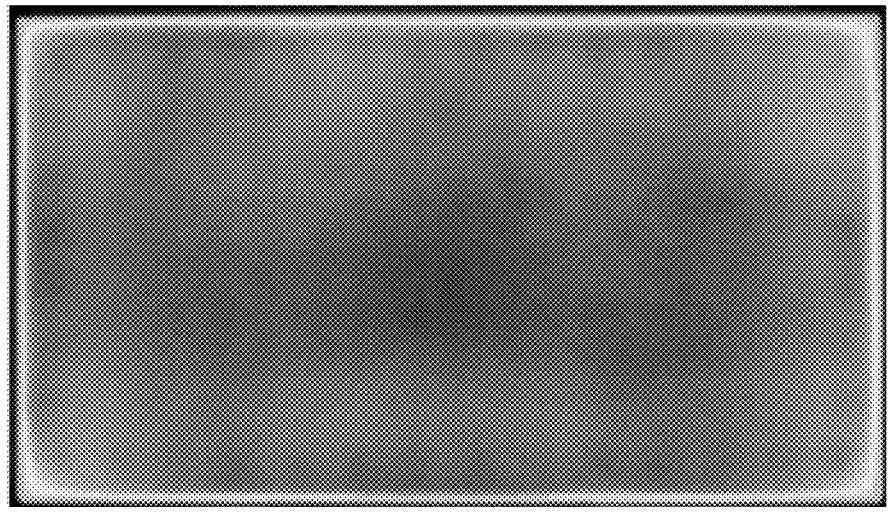
Figure 5D:
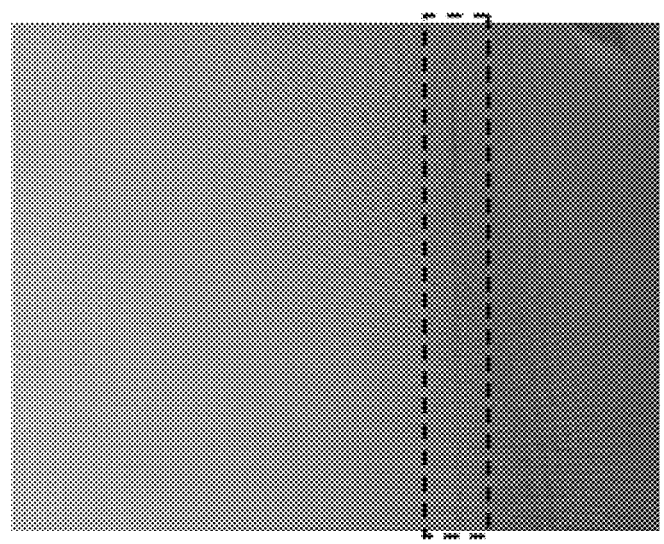

As shown in FIG. 4D, in the display device according to third comparative example, the luminance at the center portion is 757 nit, and the luminance at the peripheral portion is 612 nit. Thus, the luminance at the peripheral portion is about 80.8% of the luminance at the center portion. As compared with the display device according to an embodiment of the present disclosure, the display device of the third comparative example has a larger luminance difference between the center portion and the peripheral portion. Also, as shown in FIG. 5D, the first adhesive member of the display device of the third comparative example is visible.

Figure 4E:
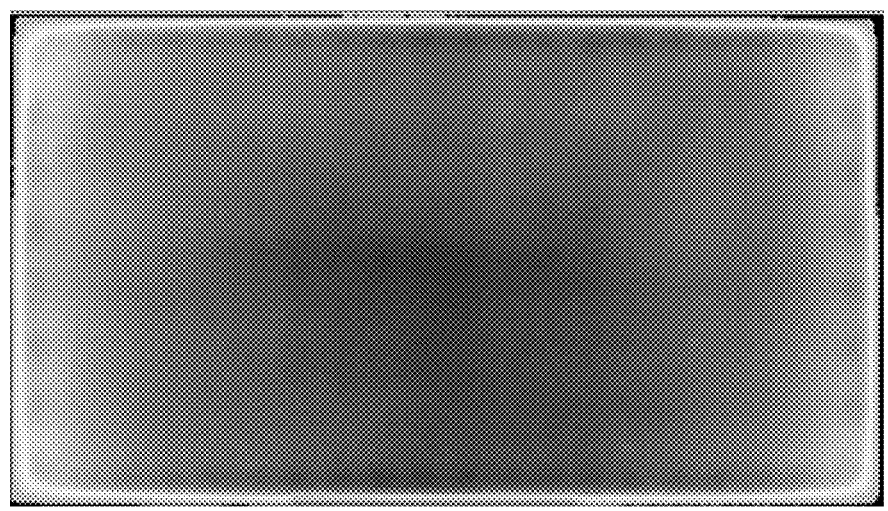
Figure 5E:
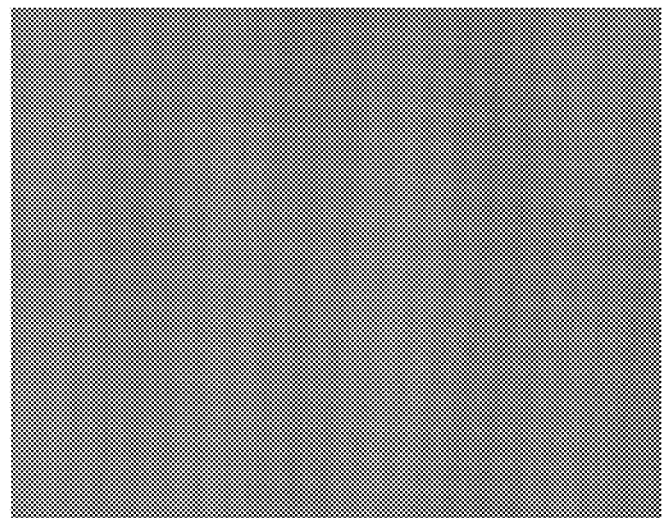

Further, as shown in FIG. 4E, in the display device according to the fourth comparative example, the luminance at the center portion is 759 nit, and the luminance at the peripheral portion is 604 nit. Thus, the luminance at the peripheral portion is about 79.6% of the luminance at the center portion. In the display device of the fourth comparative example, as shown in FIG. 5E, the first adhesive member is not visible. However, the luminance difference between the central portion and the peripheral portion is large as compared with the display device according to an embodiment of the present disclosure.

As described above, the display device according to an embodiment of the present disclosure may incorporate the first and second adhesive members having different transmittances to fix the edges of the components, thereby reducing the width of the bezel area. Also, light may be scattered by the second adhesive member and then be output to the outside through the transparent first adhesive member, whereby the dark portion around the edges of the display device can be mitigated and the visibility can be improved.

Therefore, the display device according to an embodiment of the present disclosure may have a structure with substantially no bezel area or a minimized bezel area. Accordingly, it is possible to provide a larger screen on a display device with the same external dimensions, enhance the degree of immersion, and reduce the size and weight of the display device. This may better facilitate incorporation of the display device in mobile devices. Also, in implementing a single large screen by connecting a plurality of display devices, such as in a video wall, the degree of immersion can be improved by eliminating or minimizing the bezel area.

Figure 6:
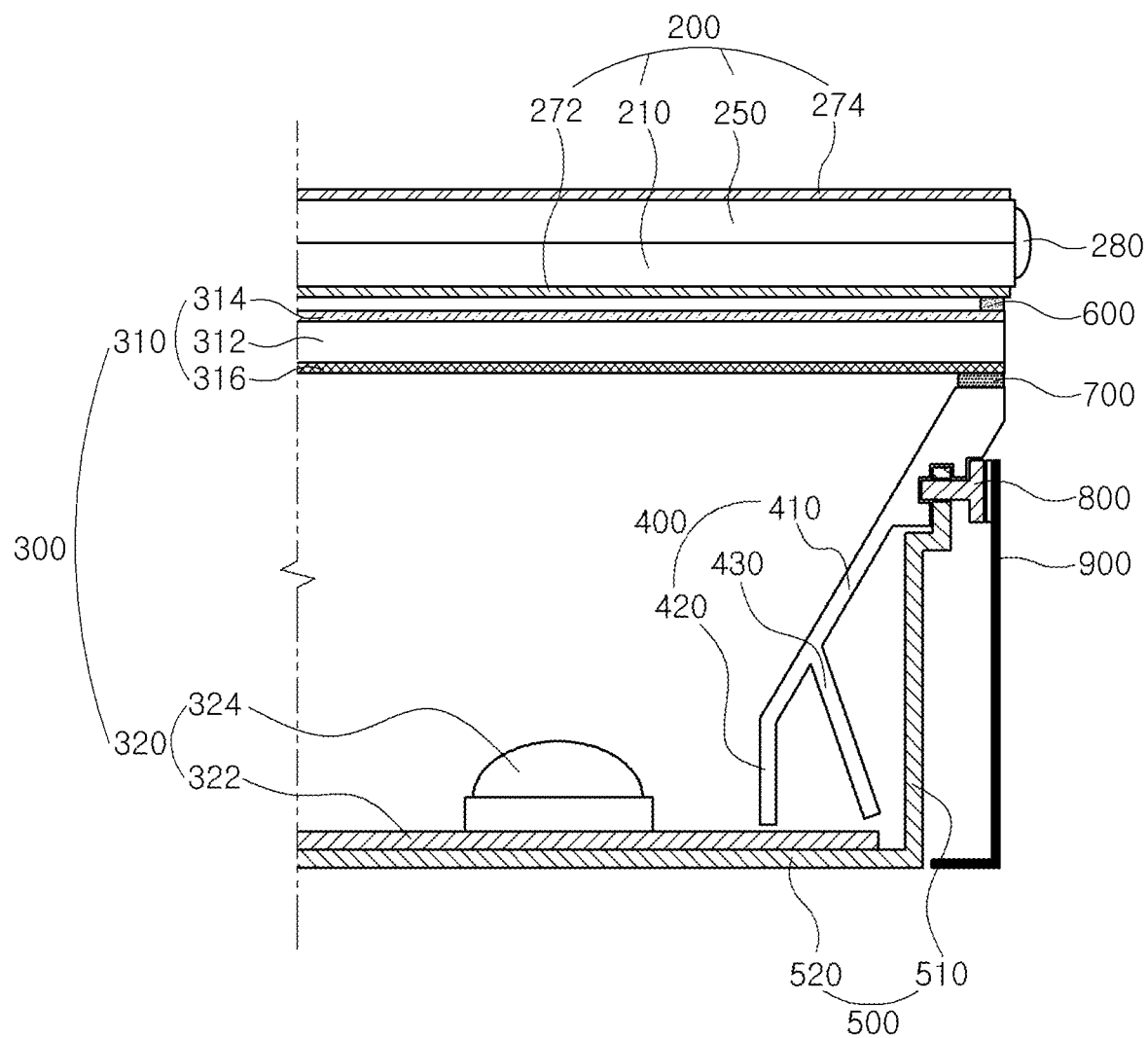
FIG. 6 is a cross-sectional view schematically showing an example of a display device according to an embodiment of the present disclosure.
Figure 7:
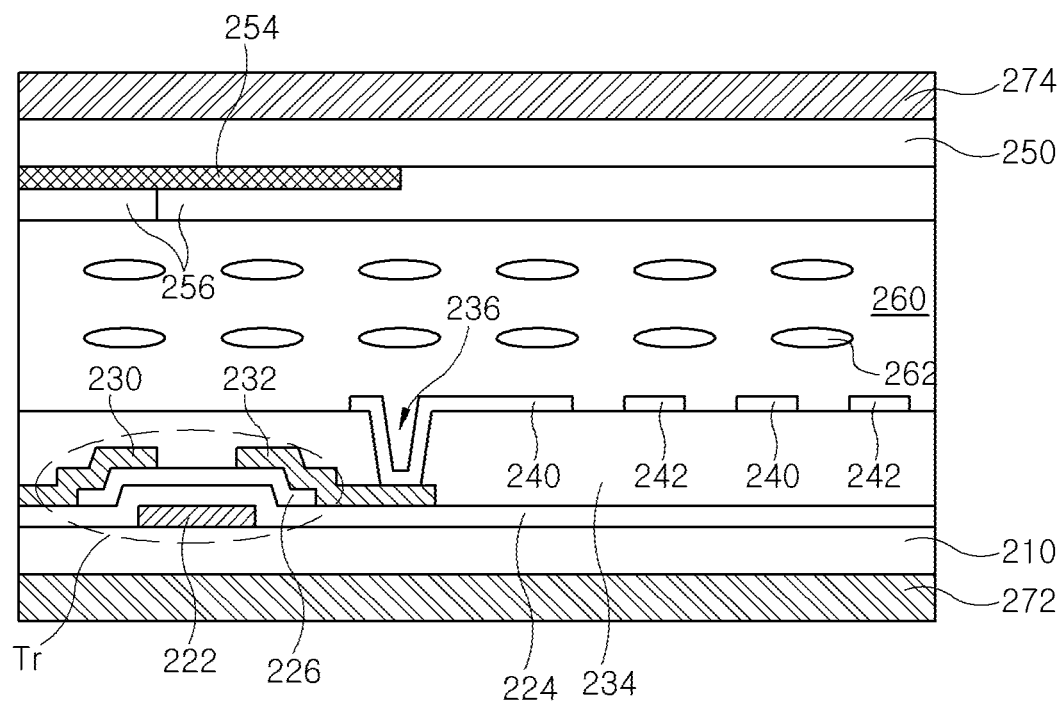
FIG. 7 is a cross-sectional view schematically showing an example of a display panel according to an embodiment of the present disclosure.
Figure 8:
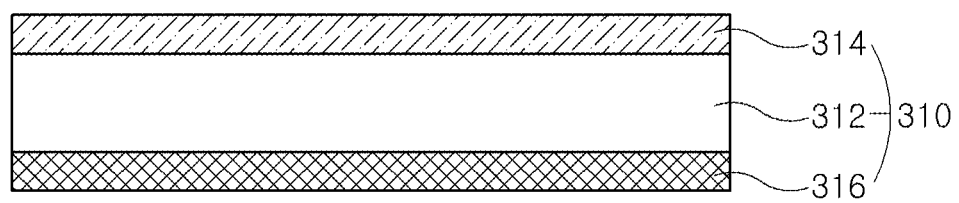
FIG. 8 is a cross-sectional view schematically showing an example of an optical member according to an embodiment of the present disclosure.

FIG. 6 is a cross-sectional view schematically showing an example of a display device according to an embodiment of the present disclosure. FIG. 7 is a cross-sectional view schematically showing an example of a display panel according to an embodiment of the present disclosure. FIG. 8 is a cross-sectional view schematically showing an example of an optical member according to an embodiment of the present disclosure. Here, the example display device is a liquid crystal display device including a liquid crystal display panel as the example display panel and a glass diffusion plate as the example optical member. Embodiments of the present disclosure encompass other types of display devices and panels, as well as other types of optical members.

As shown in FIGS. 6-8, the display device according to an embodiment of the present disclosure may include a liquid crystal display panel 200, a backlight unit 300, a main frame 400, a bottom cover 500, a first adhesive member 600, and a second adhesive member 700.

The liquid crystal display panel 200 may include a plurality of pixels and display an image through its front surface. The liquid crystal display panel 200 may have a pixel structure of FIG. 7.

More particularly, the liquid crystal display panel 200 may include first and second substrates 210 and 250 facing each other and a liquid crystal layer 260 interposed between the first and second substrates 210 and 250. The liquid crystal layer 260 includes liquid crystal molecules 262. First and second polarizers 272 and 274 may be disposed on outer surfaces of the first and second substrates 210 and 250, respectively.

The first substrate 210 may be formed of glass or plastic, and may have flexibility. In addition, a buffer layer (not shown) may be further formed on the first substrate 210.

A gate electrode 222 may be formed on an inner surface of the first substrate 210, and a gate insulation layer 224 may be formed to cover the gate electrode 224. Also, a gate line (not shown) connected to the gate electrode 222 may be formed on the first substrate 210.

A semiconductor layer 226 may be formed on the gate insulation layer 224 to correspond to the gate electrode 222. The semiconductor layer 226 may be formed of an oxide semiconductor material. Alternatively, the semiconductor layer 226 may include an active layer of intrinsic amorphous silicon and ohmic contact layers of impurity-doped amorphous silicon.

Source and drain electrodes 230 and 232 may be formed on the semiconductor layer 226 and be spaced apart from each other. In addition, a data line (not shown) connected to the source electrode 230 may be formed on the gate insulation layer 210 and cross the gate line to thereby define a pixel region.

The gate electrode 222, the semiconductor layer 226, the source electrode 230, and the drain electrode 232 constitute a thin film transistor Tr.

A passivation layer 234 may be formed on the thin film transistor Tr. The passivation layer 234 may have a drain contact hole 236 exposing the drain electrode 232.

A pixel electrode 240 and a common electrode 242 may be formed on the passivation layer 234. Parts of the pixel electrode 240 and parts of the common electrode 242 may be disposed on the passivation layer 234 in an alternating manner. The pixel electrode 240 may be connected to the drain electrode 232 through the drain contact hole 236.

A black matrix 254 may be formed on an inner surface of the second substrate 250. The black matrix 254 may shield a non-display area, such as the thin film transistor Tr, the gate line, and the data line. In addition, a color filter layer 256 may be formed on the second substrate 250 to correspond to the pixel region. A buffer layer (not shown) may be further formed between the second substrate 250 and the color filter layer 256.

The first and second substrates 210 and 250 may be attached to each other with the liquid crystal layer 260 interposed therebetween. The liquid crystal molecules 262 of the liquid crystal layer 260 may be driven by an electric field generated between the pixel electrode 240 and the common electrode 242. The pixel electrode 240, the common electrode 242, and the liquid crystal layer 260 may constitute a liquid crystal capacitor, which may be connected to the thin film transistor Tr.

Although not shown in the figure, an alignment layer may be formed on the respective inner surface of each of the first and second substrates 210 and 250, adjacent to the liquid crystal layer 260.

Further, the first and second polarizers 272 and 274, which transmit linearly polarized light along a predetermined direction, may be attached on outer surfaces of the first and second substrates 210 and 250, respectively. A light transmission axis of the first polarizer 272 may be arranged perpendicularly to a light transmission axis of the second polarizer 274.

Here, the common electrode 242 may be formed on the first substrate 210 and have parts alternating with the parts of the pixel electrode 240. Alternatively, the common electrode may be formed on a substantially entire surface of the second substrate 250, and the pixel electrode may be formed on the first substrate 210 to have a plate shape corresponding to the pixel region.

A side sealing portion 280 may be formed at respective side surfaces of the first and second substrates 210 and 250, and prevent light leakage at side surfaces of the liquid crystal display panel 200.

The backlight unit 300 may be disposed under the liquid crystal display panel 200, and provide light to the liquid crystal display panel 200. The backlight unit 300 may include a glass diffusion plate 310 and a light emitting diode (LED) assembly 320 as a light source, but is not limited thereto.

The glass diffusion plate 310 may be disposed under the liquid crystal display panel 200, that is, under the first polarizer 272. The LED assembly 320 may be disposed under the glass diffusion plate 310. Light from the LED assembly 320 may be provided to the liquid crystal display panel 200 through the glass diffusion plate 310.

As shown in FIG. 8, the glass diffusion plate 310 may include a glass substrate 312, a first sheet 314 on a first surface of the glass substrate 312, and a second sheet 316 on a second surface of the glass substrate 312. The first sheet 314 and the second sheet 316 may be attached to the glass substrate 312 by a respective adhesive layer. The glass substrate 312, the first sheet 314, and the second sheet 316 may be integrally formed to implement one-united body.

The glass substrate 312 may include soda-lime glass, but is not limited thereto.

Figure 9A:
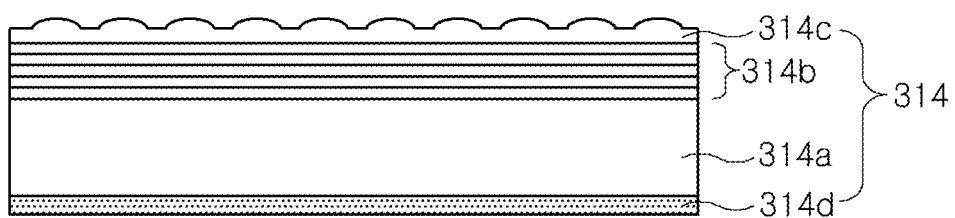
FIG. 9A and FIG. 9B are cross-sectional views schematically showing examples of first and second sheets of the glass diffusion plate according to an embodiment of the present disclosure, respectively.
Figure 9B:
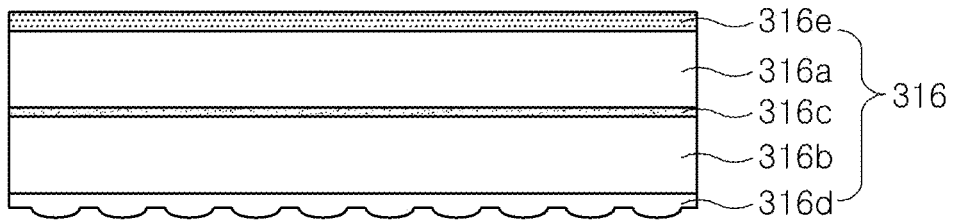

Examples of the first and second sheets 314 and 316 are described with reference to FIG. 9A and FIG. 9B, respectively. FIG. 9A and FIG. 9B are cross-sectional views schematically showing the first and second sheets 314 and 316 of the glass diffusion plate, respectively, according to an embodiment of the present disclosure, respectively.

As shown in FIG. 9A, the first sheet 314 may include a transparent element 314a, a multilayer 314b on an upper surface of the transparent element 314a, a first uneven layer 314c on the multilayer 314b, and a first adhesive layer 314d on a lower surface of the transparent element 314a.

The transparent element 314a may be formed of polyethylene terephthalate (PET), but is not limited thereto.

The multilayer 314b may have a structure in which anisotropic refractive index layers and isotropic refractive index layers are alternately laminated. The multilayer 314b may repeat selective reflection of light from the LED assembly 320 and provide the light to the liquid crystal display panel 200 to increase the light efficiency.

The first uneven layer 314c may be formed of a transparent resin including beads and have an unevenness surface. The first uneven layer 314c may change the direction of light from the multilayer 314b.

The first adhesive layer 314d may be a pressure sensitive adhesive, and the first sheet 314 may be attached to the glass substrate 312 through the first adhesive layer 314d.

Although not shown in the figure, additional patterns may be further formed between the transparent element 314a and the first adhesive layer 314d.

Next, as shown in FIG. 9B, the second sheet 316 may include a first element 316a, a second element 316b, a diffusion layer 316c between the first and second elements 316a and 316b, a second uneven layer 316d on a lower surface of the second element 316b, and a second adhesive layer 316e on an upper surface of a first element 316a.

Each of the first and second elements 316a and 316b may be formed of polyethylene terephthalate (PET), but is not limited thereto.

The diffusion layer 316c may include pores therein and diffuse light from the LED assembly 320. In addition, the diffusion layer 316c may have an adhesive property, and the first and second elements 316a and 316b may be attached to each other through the diffusion layer 316c.

The second uneven layer 316d may be formed of a transparent resin including beads and have an unevenness surface. The second uneven layer 316d may change the direction of light from the LED assembly 320.

The second adhesive layer 316e may be a pressure sensitive adhesive, and the second sheet 316 may be attached to the glass substrate 312 through the second adhesive layer 316e.

As shown in FIG. 6, the LED assembly 320 may include an LED printed circuit board 322 and LED lamps 324.

The LED lamps 324 may be arranged on the LED printed circuit board 322 with a certain distance between adjacent LED lamps. Each LED lamp 324 may include an LED package and a lens. The LED lamps 324 may be composed of red, green, and blue LED lamps emitting red, green, and blue light, respectively, or may be composed of white LED lamps emitting white light.

The main frame 400 may be disposed under the edges of the glass diffusion plate 310. The main frame 400 may support the edges of the glass diffusion plate 310 and uniformly maintain a distance between the LED lamps 324 and the glass diffusion plate 310. Here, the main frame 400 may be disposed between the glass diffusion plate 310 and the LED printed circuit board 322.

The main frame 400 may include a first frame portion 410, a second frame portion 420 and a third frame portion 430. The first frame portion 410 may support the edges of the glass diffusion plate 310 and have an inclined surface to thereby reflect light from the LED lamps 324 toward the glass diffusion plate 310. The second frame portion 420 may be connected to the lower end of the first frame portion 410, and may contact the LED printed circuit board 322 or the bottom cover 500. The third frame portion 430 may extend from the outer side of the first frame portion 410 spaced apart from the second frame portion 420, and may contact the LED printed circuit board 322 or the bottom cover 500.

The bottom cover 500 may be disposed under the LED assembly 320 and the main frame 400. The bottom cover 500 may include a vertical portion 510 and a horizontal portion 520. The vertical portion 510 of the bottom cover 500 may surround the main frame 400 and be combined with the first frame portion 410 of the main frame 400 through a connection means 800, such as a screw. Here, the vertical portion 510 may have a bent portion, thereby facilitating combination with the first frame portion 410.

The LED assembly 320 may be disposed on the horizontal portion 520 of the bottom cover 500. The horizontal portion 520 of the bottom cover 500 may protect the rear surface of the display device.

In addition, a cover shield 900 may be disposed outside the vertical portion 510 of the bottom cover 500. A driving unit (not shown) for providing signals to the liquid crystal display panel 200 may be disposed between the vertical portion 510 of the bottom cover 500 and the cover shield 900. The cover shield 900 may have at least one bent portion and have an L-like shape. The cover shield 900 may be fixed to the main frame 400, the bottom cover 500, or the connection means 800 through an adhesive.

In the display device according to an embodiment of the present disclosure, the liquid crystal panel 200 and the glass diffusion plate 310 may be fixed to each other by the first adhesive member 600, and the glass diffusion plate 310 and the main frame 400 may be fixed to each other by the second adhesive member 700. Therefore, the width of the bezel area of the display device can be decreased or minimized.

The first adhesive member 600 may have relatively high transmittance and be substantially transparent. The second adhesive member 700 may have relatively low transmittance, and may be substantially opaque and have a light scattering function. Accordingly, in the display device according to an embodiment of the present disclosure, the light from the LED lamps 324 may be scattered by the second adhesive member 700, and the scattered light may be output through the glass diffusion plate 310, the first adhesive member 600, and the liquid crystal display panel 200, thereby eliminating or mitigating the dark portion around the edges or peripheries of the display device and increasing visibility.

It will be apparent to those skilled in the art that various modifications and variations can be made in a display device of the present disclosure without departing from the technical idea or scope of the disclosure. Thus, it is intended that the present disclosure cover the modifications and variations of this disclosure, provided that they come within the scope of the appended claims and their equivalents.

What is claimed is:

1. A display device, comprising:
    a display panel configured to display an image;
    an optical member under the display panel;
    a support member under the optical member;
    a first adhesive member between the display panel and the optical member; and
    a second adhesive member between the optical member and the support member,
    wherein the first adhesive member has higher transmittance than the second adhesive member, and
    wherein a width of the second adhesive member is larger than a width of the first adhesive member.

2. The display device of claim 1, wherein the second adhesive member is configured to scatter light.

3. The display device of claim 2, wherein the second adhesive member includes scattering bodies.

4. The display device of claim 3, wherein the second adhesive member further includes a same material as the first adhesive member.

5. The display device of claim 3, wherein the scattering bodies include at least one of ZnO, TiO2, and polystyrene beads.

6. The display device of claim 1, wherein the display panel is a liquid crystal display panel, and the optical member is a glass diffusion plate.

7. The display device of claim 6, wherein the glass diffusion plate includes:
    a glass substrate;
    a first sheet at a first surface of the glass substrate, the first sheet including anisotropic refractive index layers and isotropic refractive index layers alternately laminated; and
    a second sheet at a second surface of the glass substrate opposite the first surface, the second sheet including a diffusion layer.

8. The display device of claim 1, wherein the first adhesive member has transmittance of about 80% or higher throughout a wavelength range from 430 nm to 700 nm.

9. The display device of claim 1, wherein the optical member is connected to the display panel via the first adhesive member at an outer periphery of the display panel.

10. The display device of claim 9, wherein luminance of the display panel at the outer periphery of the display panel is more than 80% of luminance of the display panel at a center portion of the display panel.

11. A display device, comprising:
    a display panel configured to display an image;
    an optical member under the display panel;
    a first adhesive member between the display panel and the optical member, and connecting the display panel and the optical member at an outer periphery of the display panel, the first adhesive member being substantially transparent;
    a support member under the optical member; and
    a second adhesive member between the optical member and the support member, and connecting the optical member and the support member at an outer periphery of the optical member, wherein the first adhesive member overlaps with the second adhesive member in a plan view and has a smaller width than the second adhesive member in the plan view.

12. The display device of claim 11, wherein the first adhesive member has transmittance of about 80% or higher throughout a wavelength range from 430 nm to 700 nm.

13. The display device of claim 11, wherein the first adhesive member includes an adhesive composition comprising an acrylate oligomer, a urethane oligomer, and a photoinitiator.

14. The display device of claim 13, wherein the acrylate oligomer composes 40% to 60% of the adhesive composition in weight.

15. The display device of claim 11, wherein luminance of the display panel at the outer periphery of the display panel is more than 80% of luminance of the display panel at a center portion of the display panel.

16. The display device of claim 11, wherein a side surface of the display panel protrudes outward from a side surface of the optical member.

17. The display device of claim 11, wherein the second adhesive member includes a same material as the first adhesive member and has lower transmittance than the first adhesive member.

18. The display device of claim 11, further comprising a light source under the optical member, wherein the second adhesive member is disposed between the light source and the optical member.

19. The display device of claim 1, further comprising a light source under the optical member, wherein the second adhesive member is disposed between the light source and the optical member.

* * * * *